United States Patent
Bonacina et al.

(10) Patent No.: US 10,061,427 B2
(45) Date of Patent: Aug. 28, 2018

(54) SELECTING FIRST DIGITAL INPUT BEHAVIOR BASED ON A SECOND INPUT

(71) Applicant: Microsoft Technology Licensing, LLC, Redmond, WA (US)

(72) Inventors: Silvano Bonacina, Redmond, WA (US); Francis Zhou, Redmond, WA (US); Xiao Tu, Medina, WA (US); David W. Duhon, Redmond, WA (US); David Abzarian, Kenmore, WA (US); Moshe R. Lutz, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/192,450

(22) Filed: Jun. 24, 2016

(65) Prior Publication Data

US 2017/0277333 A1    Sep. 28, 2017

Related U.S. Application Data

(60) Provisional application No. 62/312,814, filed on Mar. 24, 2016.

(51) Int. Cl.
  *G06F 3/045*     (2006.01)
  *G06F 3/041*     (2006.01)
  (Continued)

(52) U.S. Cl.
  CPC ........ *G06F 3/0416* (2013.01); *G06F 3/03545* (2013.01); *G06F 3/0412* (2013.01);
  (Continued)

(58) Field of Classification Search
  CPC .... G06F 3/041; G06F 3/0488; G06F 3/04883; G06F 2203/04808; Y10S 715/964
  See application file for complete search history.

(56) References Cited

U.S. PATENT DOCUMENTS

| | | | |
|---|---|---|---|
| 8,487,889 B2 | 7/2013 | King | |
| 8,896,621 B1 | 11/2014 | Sipher et al. | |

(Continued)

FOREIGN PATENT DOCUMENTS

| | | |
|---|---|---|
| CN | 103209261 A1 | 7/2013 |
| EP | 1852774 | 11/2007 |

(Continued)

OTHER PUBLICATIONS

"TactilisQuickHelp", Published on: Dec. 17, 2014 Available at: http://www.tactilisapp.com/TactilisQuickHelp.pdf.

(Continued)

*Primary Examiner* — Nelson Rosario

(57) ABSTRACT

A computing device includes a digital input system that provides digital input functionality for the computing device. The digital input system receives both a first input and a second input. The first input is typically an input with the user's dominant hand (e.g., using a pen, stylus, finger, etc.), and the second input is typically an input with the user's non-dominant hand. The digital input system determines whether a second input is received simultaneously with the first input, and selects one of multiple behaviors for the first input based on whether the second input is received simultaneously with the first input. Various different behaviors for the first input can be selected from, such as freehand or freeform input, constraining digital input corresponding to the first input to be along an edge of a stencil, and so forth.

20 Claims, 9 Drawing Sheets

(51) Int. Cl.
*G06F 3/0488* (2013.01)
*G06F 3/0354* (2013.01)

(52) U.S. Cl.
CPC .............. *G06F 3/04883* (2013.01); *G06F 2203/04106* (2013.01); *G06F 2203/04108* (2013.01)

(56) References Cited

U.S. PATENT DOCUMENTS

| | | | |
|---|---|---|---|
| 9,229,636 | B2 | 1/2016 | Tijssen et al. |
| 2011/0019058 | A1 | 1/2011 | Sakai et al. |
| 2012/0262407 | A1 | 10/2012 | Hinckley et al. |
| 2013/0016126 | A1* | 1/2013 | Wang .................. G06F 3/041 345/650 |
| 2013/0067392 | A1 | 3/2013 | Leonard et al. |
| 2013/0111380 | A1 | 5/2013 | Parker et al. |
| 2013/0321350 | A1 | 12/2013 | Mesaros et al. |
| 2013/0335337 | A1 | 12/2013 | Chua et al. |
| 2013/0346924 | A1 | 12/2013 | Morrill et al. |
| 2014/0104189 | A1* | 4/2014 | Marshall ............... G06F 3/0416 345/173 |
| 2015/0212711 | A1 | 7/2015 | Adams |
| 2016/0054893 | A1 | 2/2016 | Dowd et al. |
| 2016/0077650 | A1* | 3/2016 | Durojaiye ............ G06F 3/041 345/173 |

FOREIGN PATENT DOCUMENTS

| | | |
|---|---|---|
| EP | 2669783 A1 | 12/2013 |
| EP | 2720110 | 4/2014 |
| WO | WO-2007133483 | 11/2007 |
| WO | 2013046758 A1 | 4/2013 |

OTHER PUBLICATIONS

"ArtRage Stencils", Published on: Jan. 21, 2016 Available at: https://www.artrage.com/manuals/artrage-4/stencils/.

Kortenkamp, et al., "User Interface Design for Dynamic Geometry Software", In Journal of Acta Teaching Napocesiak, vol. 3, No. 2, Jun. 1, 2010, pp. 59-66.

"International Search Report and Written Opinion", Application No. PCT/US2017/023125, dated Jun. 30, 2017, 15 pages.

* cited by examiner

SELECTING FIRST DIGITAL INPUT BEHAVIOR BASED ON A SECOND INPUT

RELATED APPLICATIONS

This application claims priority under 35 U.S.C. Section 119(e) to U.S. Provisional Application No. 62/312,814, filed Mar. 24, 2016 and titled "Selecting First Digital Input Behavior Based On A Second Input", the entire disclosure of which is hereby incorporated by reference.

BACKGROUND

Devices today (e.g., computing devices) typically support a variety of different input techniques. For instance, a particular device may receive input from a user via a keyboard, a mouse, voice input, touch input (e.g., to a touchscreen), and so forth. One particularly intuitive input technique enables a user to utilize a touch instrument (e.g., a pen, a stylus, a finger, and so forth) to provide freehand input to a touch-sensing functionality such as a touchscreen. The freehand input may be converted to a corresponding visual representation on a display, such as for taking notes, for creating and editing an electronic document, and so forth.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a first input is received from an input device. A determination is made as to whether a second input to a computing device is received simultaneously with receipt of the first input. One of multiple input behaviors is selected for the first input. A first behavior is selected for the first input in response to determining that the second input to the computing device is received simultaneously with receipt of the first input, and a second behavior is selected for the first input in response to determining that the second input to the computing device is received at a different time than the first input. A display of data is controlled by the computing device based at least on the first input as well as the selected one of the multiple input behaviors.

In accordance with one or more aspects, a computing device includes an input data collection module, an input behavior determination module, and a data display module. The input data collection module comprises instructions configured to receive a first input and a second input. The input behavior determination module comprises instructions configured to determine whether the second input is received simultaneously with the first input, and further configured to select a first of multiple behaviors for the first input in response to the second input being received simultaneously with the first input, and to select a second of the multiple behaviors for the first input in response to the second input being received at a different time than the first input. The data display module comprises instructions configured to control a display of data based at least on both the first input and the selected behavior for the first input.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
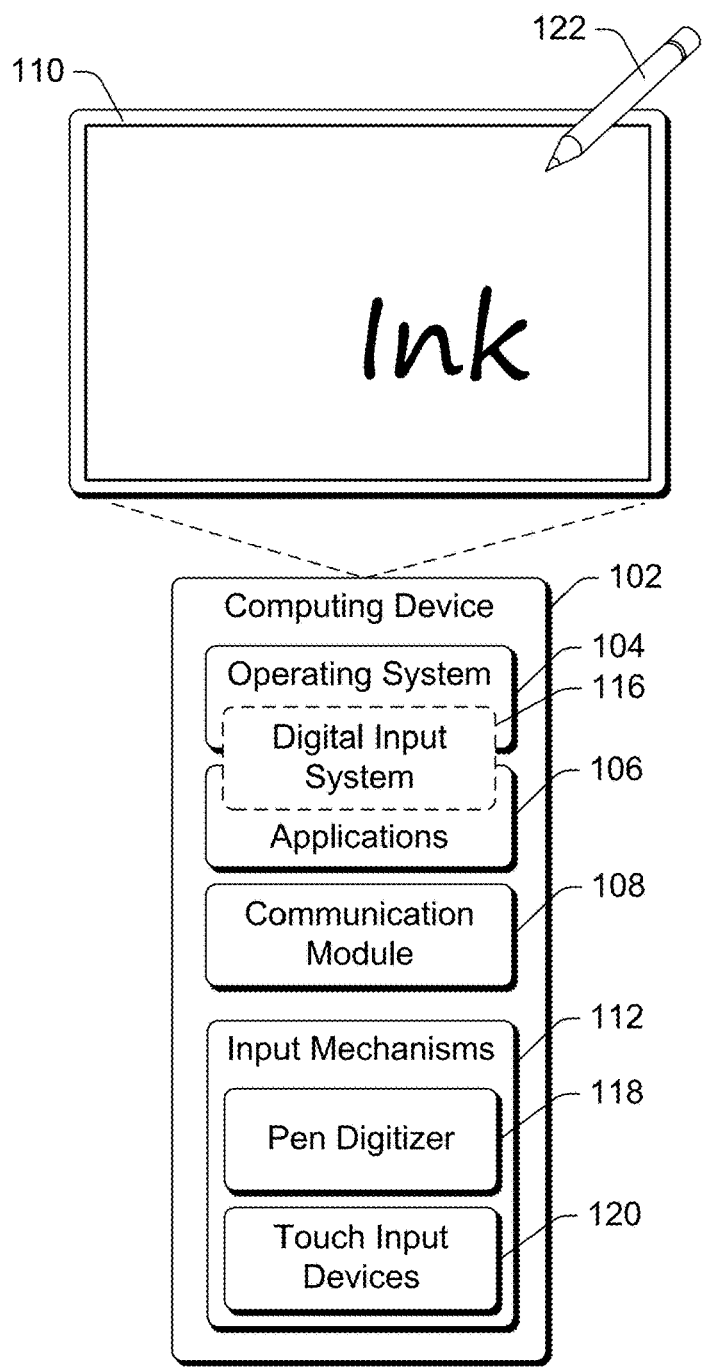
FIG. 1 illustrates an example environment in which the selecting first digital input behavior based on a second input discussed herein can be used.

Selecting first digital input behavior based on a second input is discussed herein. A computing device includes a digital input system that provides digital input functionality for the computing device. The digital input system can be implemented as part of an application, as a standalone application that provides digital input support to other applications, or combinations thereof. A digital input (also referred to herein as just an input) refers to a user input to a computing device. Digital inputs may be provided in various ways, such as using a pen (e.g., an active pen, a passive pen, and so forth), a stylus, a finger, and so forth. The digital inputs discussed herein are provided by movement of an input device (e.g., stylus, pen, finger, mouse, etc.) in a freehand manner and thus can also be referred to as freehand digital inputs. The digital input system provides functionality allowing applications to receive digital inputs from a user of the computing device, store received digital inputs, and control the display of data based on the digital inputs.

Various different types of digital inputs can be supported by the digital input system. In one or more embodiments, the digital input system supports digital ink that can be displayed on a display device. Generally, digital ink refers to freehand input to a touch-sensing device such as a touchscreen, which is interpreted by the computing device as digital ink (or simply "ink"). Additionally or alternatively, the digital input system supports other types of digital inputs, such as digital input to erase or delete a portion of data previously input, digital input to control a direction of movement (e.g., a route or path for a vehicle to take, a route or path for a game), and so forth.

The digital input system receives digital input from a user and analyzes the digital input to collect input data for the digital input. This input data refers to various information describing the digital input, such as the coordinates on the input device where the digital input occurred and pressure information indicating an amount of pressure applied at each of those coordinates for the digital input. A digital input also optionally refers to the movement of the input device or object (e.g., a pen, stylus, finger, etc.) along an input surface from a beginning location (e.g., where the input device is brought into contact with the input surface) to an ending location (e.g., where the input device is pulled away from the input surface).

The digital input system can receive two inputs, referred to as a first input (also referred to as a first digital input) and a second input (also referred to as a second digital input). In one or more embodiments, the first input is also referred to as a primary digital input (e.g., the first input being the digital input the user is intending to input) and the second input is also referred to as a secondary digital input (e.g., the presence of or absence of the second input simultaneously with the first input is controlling or selecting the behavior of the first input). The first input is an input using one of the user's hands (typically the user's dominant hand) and can be any type of digital input (e.g., using a pen, stylus, finger, mouse, etc.). The second input is an input using the other of the user's hands (typically the user's non-dominant hand). The first input and/or second input can be, but need not be, a touch input. An input being a touch input refers to the input being sensed by a device (e.g., a touchscreen display or other input device) as physically touching the device (e.g., based on pressure applied, optical or image capture, and so forth).

The digital input system determines whether a second input is received simultaneously with the first input, and selects one of multiple behaviors for the first input based on whether the second input is received simultaneously with the first input. The behavior of the first input refers to the operations performed by the digital input system (optionally in conjunction with one or more other applications or programs) in response to the first input, and thus also refers to the behavior of the digital input that is the first input. Various different behaviors for the first input can be supported by the digital input system. For example, the behavior of the first input may be constraining the first input to be along an edge of a stencil if the second input is received simultaneously with the first input, whereas the behavior of the first input may be freeform digital input if the second input is not received simultaneously with the first input.

The techniques discussed herein provide a robust and user friendly experience with digital inputs. The user can readily have the digital input system change the behavior of a first input simply by providing or not providing the second input. This allows the digital input system to provide a user interface that is easy for the user to control and provide digital input. For example, if a user desires to draw a straight line (e.g., along a ruler), rather than requiring the user to navigate through a menu system to select a ruler, or have the user place a physical ruler on or near a touchscreen, the user can simply touch the touchscreen with one or more fingers of his or her non-dominant hand, draw a line with a pen using his or her dominant hand, and have the line drawn smooth and straight (conforming to the straight edge of the ruler).

FIG. 1 illustrates an example environment 100 in which the selecting first digital input behavior based on a second touch input discussed herein can be used. The environment 100 includes a computing device 102 that can be embodied as any suitable device such as, by way of example, a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), an entertainment device (e.g., an entertainment appliance, a set-top box communicatively coupled to a display device, a game console), an Internet of Things (IoT) device (e.g., objects or things with software, firmware, and/or hardware to allow communication with other devices), a television or other display device, an automotive computer, and so forth. Thus, the computing device 102 may range from a full resource device with substantial memory and processor resources (e.g., personal computers, game consoles) to a low-resource device with limited memory and/or processing resources (e.g., traditional set-top boxes, hand-held game consoles).

The computing device 102 includes a variety of different functionalities that enable various activities and tasks to be performed. For instance, the computing device 102 includes an operating system 104, multiple applications 106, and a communication module 108. Generally, the operating system 104 is representative of functionality for abstracting various system components of the computing device 102, such as hardware, kernel-level modules and services, and so forth. The operating system 104, for instance, can abstract various components of the computing device 102 to the applications 106 to enable interaction between the components and the applications 106.

The applications 106 represent functionalities for performing different tasks via the computing device 102. Examples of the applications 106 include a word processing application, an information gathering and/or note taking application, a spreadsheet application, a web browser, a gaming application, and so forth. The applications 106 may be installed locally on the computing device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The communication module 108 is representative of functionality for enabling the computing device 102 to communicate over wired and/or wireless connections. For instance, the communication module 108 represents hardware and logic for communication via a variety of different wired and/or wireless technologies and protocols.

The computing device 102 further includes a display device 110, input mechanisms 112, and a digital input system 116. The display device 110 generally represents functionality for visual output for the computing device 102. Additionally, the display device 110 optionally represents functionality for receiving various types of input, such as touch input, pen input, and so forth. The input mechanisms 112 generally represent different functionalities for receiving input to the computing device 102. Examples of the input mechanisms 112 include gesture-sensitive sensors and devices (e.g., such as touch-based sensors and movement-tracking sensors (e.g., camera-based)), a mouse, a keyboard, a stylus, a touch pad, accelerometers, a microphone with accompanying voice recognition software, and so forth. The input mechanisms 112 may be separate or integral with the display 110; integral examples include gesture-sensitive displays with integrated touch-sensitive or motion-sensitive sensors. The input mechanisms 112 optionally include a pen digitizer 118 and/or touch input devices 120. The pen digitizer 118 represents functionality for converting various types of input to the display device 110 and/or the touch input devices 120 into digital data that can be used by the computing device 102 in various ways, such as for generating digital ink. The touch input devices 120 represent functionality for providing touch input separately from the display 110.

Although reference is made herein to the display device 110 receiving various types of input such as touch input or pen input, alternatively the display device 110 may not receive such input. Rather, a separate input device (e.g., a touchpad) implemented as a touch input device 120 can receive such input. Additionally or alternatively, the display device 110 may not receive such input, but a pen (such as pen 122) can be implemented as a touch input device 120, and the pen provides an indication of the input rather than the input being sensed by the display device 110.

According to various implementations, the digital input system 116 represents functionality for performing various aspects of the techniques for selecting first digital input behavior based on a second touch input discussed herein. Various functionalities of the digital input system 116 are discussed herein. In one or more embodiments, the digital input system 116 is implemented as an application 106 (or a program of the operating system 104) that provides digital input support to other applications 106 (or programs of the operating system 104). The digital input system 116 optionally includes an application programming interface (API) allowing the applications 106 or other programs to interact with the functionality provided by the digital input system 116. Alternatively, the digital input system 116 can be implemented in an application 106 and provide digital input support for that application 106 but not for other applications 106. Alternatively, the digital input system 116 can be implemented as a combination thereof. For example, some functionality of the digital input system 116 can be implemented in an application 106 (or a program of the operating system 104) that provides digital input support to other applications 106 or programs, and other functionality of the digital input system 116 can be implemented in the individual applications 106 to which the digital input system 116 provides support.

The environment 100 further includes a pen 122, which is representative of an input device for providing input to the display device 110. Generally, the pen 122 is in a form factor of a traditional pen but includes functionality for interacting with the display device 110 and other functionality of the computing device 102. In at least some implementations, the pen 122 is an active pen that includes electronic components for interacting with the computing device 102. The pen 122, for instance, includes a battery that can provide power to internal components of the pen 122. Alternatively or additionally, the pen 122 may include a magnet or other functionality that supports hover detection over the display device 110. This is not intended to be limiting, however, and in at least some implementations the pen 122 may be passive, e.g., a stylus without internal electronics.

Digital input can be provided by the user using the pen 122. Additionally or alternatively, digital input can be provided by the user using other input mechanisms, such as the user's finger, a stylus, and so forth.

In one or more embodiments, the digital input system 116 saves the digital input. The digital input can be saved in various formats, such as a Scalable Vector Graphics (SVG) format. The digital input can be stored in a digital input store (e.g., a storage device local to the computing device 102 and/or accessed via a network) by the digital input system 116 and/or the applications 106.

Figure 2:
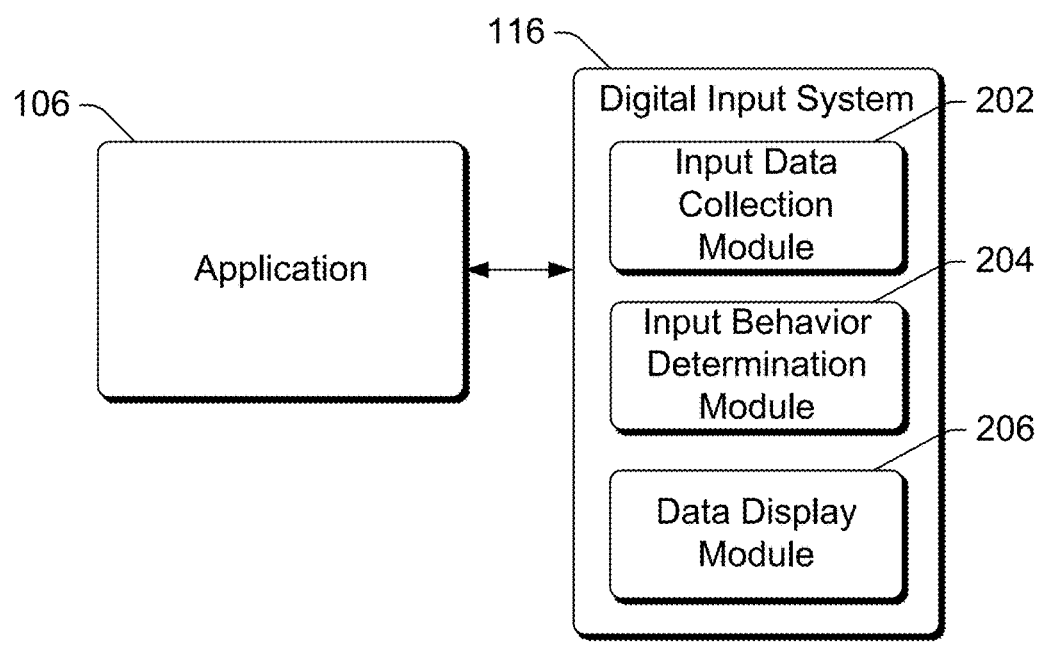
FIG. 2 illustrates an example system including an application and digital input system in accordance with one or more embodiments.

FIG. 2 illustrates an example system 200 including an application and digital input system in accordance with one or more embodiments. FIG. 2 is discussed with reference to elements of FIG. 1. The digital input system 116 includes an input data collection module 202, an input behavior determination module 204, and a data display module 206. The digital input system 116 optionally communicates with an application 106, which can performs various operations based on the input data as discussed in more detail below.

The input data collection module 202 collects input data for digital inputs (e.g., to the computing device 102). A digital input is described using various information referred to as input data. In one or more embodiments, the input data includes a set of coordinates and optionally pressure applied at each coordinate. The coordinates can be in various coordinate systems, such as a 2-dimensional Cartesian coordinate system, a polar coordinate system, and so forth. The pressure or force can be measured in various units, such as pascals. The coordinates and optionally pressure can be sensed by various sensors of the touch input devices 120 (e.g., sensors in the display device 110, sensors in the pen 122, and so forth). The input data can additionally or alternatively include other data, such as an angle or tilt of the input device, a shape of the input device (e.g., in contact with a touchscreen), and so forth.

The coordinates included in the input data are a set or series of coordinates that identify the location of the input mechanism at particular times as the digital input is being provided by the user. These particular times can be regular or irregular intervals (e.g., every 10 milliseconds). The coordinates are detected or sensed by the pen digitizer 118 or a touch input device 120, such as by the display device 110, by the pen 122, and so forth. Using the example of the digital ink input of "Ink" in FIG. 1, the input data for the digital ink input is the coordinates that identify the location of the input mechanism as the letter "I" is written, as the letter "n" is written, and as the letter "k" is written. In one or more embodiments, as used herein a digital input refers to the movement of the input device or object from being first sensed as providing input (e.g., touching a touchscreen device or a "pen down" event) through the input device or objet no longer being sensed as providing input (e.g., the input device being lifted away from the touchscreen device or a "pen up" event).

The input data collection module 202 receives a first input and optionally a second input. The first input and second input can each be provided using various different input devices or objects (e.g., pens, stylus, fingers, etc.). The first input and second input are each provided via a different hand of the user, the first input typically being provided by a dominant hand of the user and the second input typically being provided by the non-dominant hand of the user. The input data collection module 202 is able to distinguish between the first input and the second input.

The input data collection module 202 can distinguish between the first input and the second input in a variety of different manners. In one or more embodiments, second inputs are provided as touch inputs using one or more fingers (and/or palm) and first inputs are provided using an active pen (e.g., as touch or other types of inputs). The input data collection module 202 can distinguish between finger (and/or palm) touches and active pen touches (e.g., by a signal provided by the active pen to the computing device 102, by an area of a touchscreen or pen digitizer touched by the active pen, etc.). Thus, the input data collection module 202 can readily distinguish between the first input and the second input.

Additionally or alternatively, first inputs and second inputs can both be provided as touch inputs using one or more fingers (and/or palms). In such situations, the input data collection module 202 can distinguish between the dominant hand of the user and the non-dominant hand of the user, and identifies touch inputs from the dominant hand of the user as first inputs, and touch inputs from the non-dominant hand of the user as second inputs. The input data collection module 202 can distinguish between the dominant hand of the user and the non-dominant hand of the user using any of a variety of public and/or proprietary techniques. For example, the user can specify which is his or her dominant hand and non-dominant hand (e.g., if the right hand is the dominant hand, then the input data collection module 202 can determine that a right-most touch input is from the dominant hand). By way of another example, various other devices can be used to identify which hand is the dominant hand and which is the non-dominant hand, such as cameras monitoring user touch inputs or other user actions, accelerometer values received during touch inputs, jewelry or devices (e.g., that are sensed or communicate with the computing device 102) worn on a user's hand (or hands), and so forth.

Various different behaviors are supported for the first input, and the input behavior determination module 204 selects one of the multiple first inputs based on whether the second input is detected simultaneously with the first input. Thus, for example, one behavior for the first input is selected if the user is not touching the touchscreen with his or her non-dominant hand while the first input is received (or at least at the start of the first input), and a different behavior is selected if the user is touching the touchscreen with his or her non-dominant hand while the first input is received (or at least at the start of the first input).

Once the behavior for the first input is selected, various operations can be performed on the input data. These operations can include modifying the input data (e.g., so that it conforms to (e.g., is adjacent to) an edge of a stencil or some other shape), generating additional input data (for display on a display of the computing device 102 or a different display), combinations thereof, and so forth. The input data (optionally as operated on) is provided to the data display module 206, which controls the display of data on a display device based on the digital input as appropriate. In some situations, controlling the display of data includes displaying the digital input (e.g., in situations in which the digital input is digital ink). Additionally or alternatively, controlling the display of data can include erasing data, determining a location to which icons or characters in a game are to be moved, generating a path for a vehicle (e.g., a drone), and so forth.

Various different second inputs can be detected, such as single finger touch, 2-finger touch, 3-finger touch, and so forth. The input behavior determination module 204 determines whether criteria for a second input is satisfied (e.g., a particular number or at least a threshold number of fingers are touching the touchscreen), and determine that the second input occurs in response to the criteria being satisfied. The criteria for the second input can also include particular areas or portions of a touchscreen or input device that are to be touched, such as a location where digital ink (e.g., a line) is already drawn, a location where a particular object is displayed, and so forth.

In one or more embodiments, if the second input is received simultaneously with the first input, then one behavior of the first input is selected. This selected behavior continues to be the behavior of the first input until the digital input ends (e.g., the input device or object is no longer sensed by the input data collection module 202). Additionally or alternatively, the selected behavior can continue until the second input is no longer being received, at which point a different behavior for the first input is selected. The second input being received simultaneously with the first input refers to the second input and the first input being received concurrently for at least a threshold amount of time (e.g., 200 milliseconds), or not concurrently but within a threshold amount of time (e.g., within 100 milliseconds) of one another. Thus, if the second input and the first input are received at different times (e.g., not concurrently for at least a threshold amount of time, or not within a threshold amount of time of one another), the second input is referred to as not being received simultaneously with the first input.

Various different behaviors of the first input can be selected from. In one or more embodiments, the input behavior determination module 204 selects the behavior, although alternatively an indication of whether the second input is received simultaneously with the first input can be provided to the application 106 and the application can select the behavior of the first input. The implementation of the selected behavior (which can include modifying the input data and/or generating additional input data) can be performed by the digital input system 116 and/or the application 106 using any of a variety of public and/or proprietary techniques.

Which of the multiple different behaviors is selected for situations in which the second input is received simultaneously with the first input and which of the multiple different behaviors is selected for situations in which the second input is not received simultaneously with the first input can be specified in different manners. For example, user preference settings can specify which behavior is associated with simultaneous first input and second input receipt and which behavior is associated with non-simultaneous first input and second input receipt. By way of another example, the digital input system 116 and/or application 106 can provide default settings or use other rules or criteria to determine which behavior is associated with simultaneous first input and second input receipt and which behavior is associated with non-simultaneous first input and second input receipt.

One example of a behavior that can be selected is freeform input using the first input. With freeform input the digital input is the digital input received (e.g., including some wiggle or wobble in the line due to slight movements of the user's hand when providing the digital input).

Another example of a behavior that can be selected is drawing a smooth circle, arc, or ellipse. The digital input received as the first input is modified to generate a smooth circle, arc, or ellipse.

Another example of a behavior that can be selected is conforming the digital input to the edge of a soft stencil. A "soft" stencil is used (and optionally displayed), the soft stencil referring to a stencil that is generated and displayed by the application 106 (or other program running on the computing device 102) in contrast to a physical stencil available to a user of the application 106. Various different stencils can be used, such as a ruler, a protractor, a circle, a French curve, and so forth. When using a stencil, the input data is modified as appropriate so that the digital input conforms to the edge of the stencil rather than being freeform.

Another example of a behavior that can be selected is mirroring the digital input from the first input. Mirroring the digital input refers to creating an additional digital input about one or more axes or lines (e.g., a vertical axis or a horizontal axis). For example, the user may desire to draw a heart shape and provide digital input that is the right half of the heart shape. An additional digital input that is the left half of the heart shape is automatically generated.

Another example of a behavior that can be selected is projecting the digital input to another display (in addition to or in place of providing the digital input to the display of the computing device 102). For example, the computing device 102 may be a tablet or smartphone, and the digital input may be projected from the tablet or smartphone to a larger television or monitor.

FIGS. 3-7 illustrate examples of using the selecting first digital input behavior based on a second touch input techniques discussed herein in accordance with one or more embodiments. FIGS. 3-7 are discussed with reference to elements of FIGS. 1 and 2.

Figure 3:
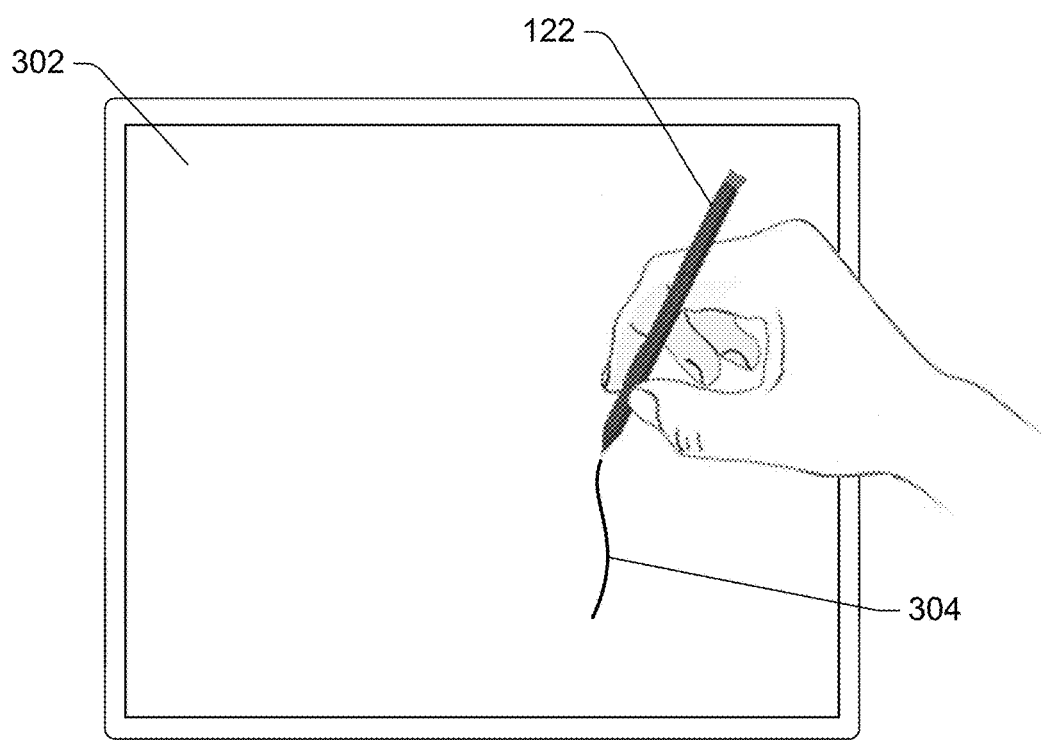
FIGS. 3, 4, 5, 6, and 7 illustrate examples of using the selecting first digital input behavior based on a second input techniques discussed herein in accordance with one or more embodiments.

FIG. 3 illustrates an example 300 in which a first input is received from the pen 122, and no second input is received simultaneously with the first input. In the example 300, the pen 122 is used to provide a digital input on a touchscreen display 302. In response to the first input and the second input not being received simultaneously, a first input behavior of freeform input is selected. The user may attempt to draw a smooth straight line, but due to the wiggly or wobbly nature of the freehand input with the pen 122 the digital input is displayed as a line 304 that is not a smooth straight line.

Figure 4:
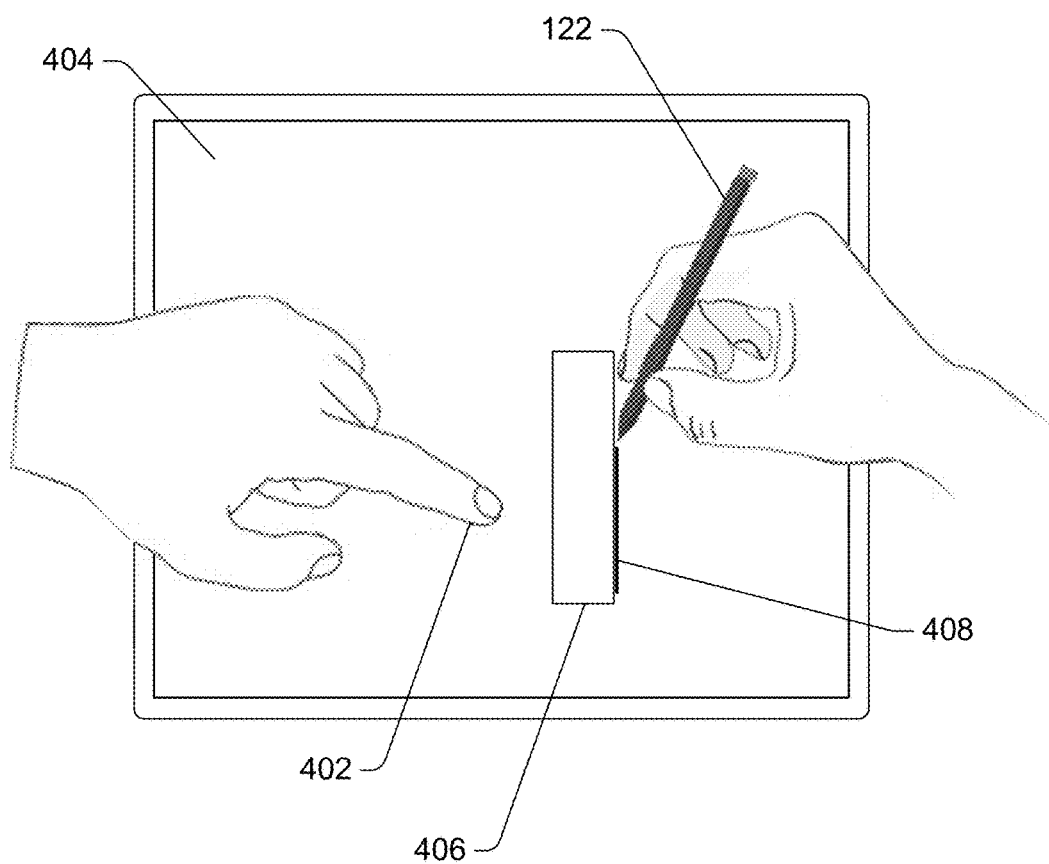

FIG. 4 illustrates an example 400 in which a first input is received from the pen 122, and a second input is received simultaneously with the first input. The second input is a finger 402 of the user's non-dominant hand touching the touchscreen display 404. In response to the first input and the second input being received simultaneously, a soft stencil 406 (illustrated as a ruler) is displayed and a first input behavior of drawing a smooth straight line along the soft stencil 406 is selected. The soft stencil 406 can be displayed in different locations on the display 404, such as at a default location, at a location adjacent to or on top of the finger 402, at a location at which the tip of the pen 122 is adjacent an edge of the soft stencil 406, and so forth. The user can optionally move (e.g., up, down, left, right, rotate, etc.) the ruler by moving his or her finger 402 in a corresponding manner (e.g., up, down, left, right, rotate, etc.). The pen 122 is used to provide a digital input on the touchscreen display 404, but the input data is modified so that the digital input conforms to the edge of the soft stencil 406, providing a digital input that results in display of a smooth straight line 408 despite any wiggle or wobble that may be present in the pen 122 due to the freehand nature of the first input.

Figure 5:
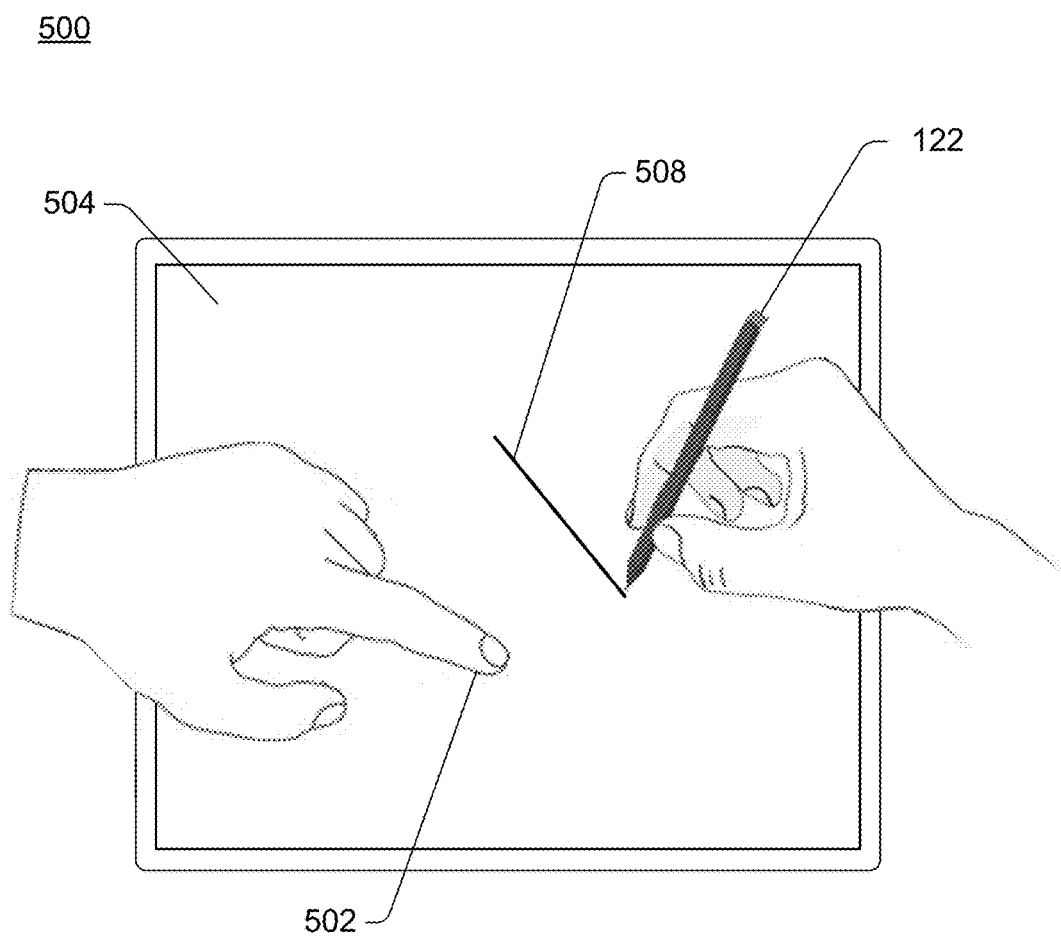

FIG. 5 illustrates an example 500 in which a first input is received from the pen 122, and a second input is received simultaneously with the first input. The second input is a finger 502 of the user's non-dominant hand touching the touchscreen display 504. The location at which the finger touches the touchscreen display 504 can be unrelated to the location at which the first input is received. In response to the first input and the second input being received simultaneously, a first input behavior of drawing a smooth straight line is selected. The pen 122 is used to provide a digital input on the touchscreen display 504, but the input data is modified so that the digital input conforms to a smooth straight line, providing a digital input that results in display of a smooth straight line 506 despite any wiggle or wobble that may be present in the pen 122 due to the freehand nature of the first input. The example 500 is similar to the example 400 of FIG. 4, although no soft stencil 506 (e.g., a ruler) is displayed in the example 500.

Figure 6:
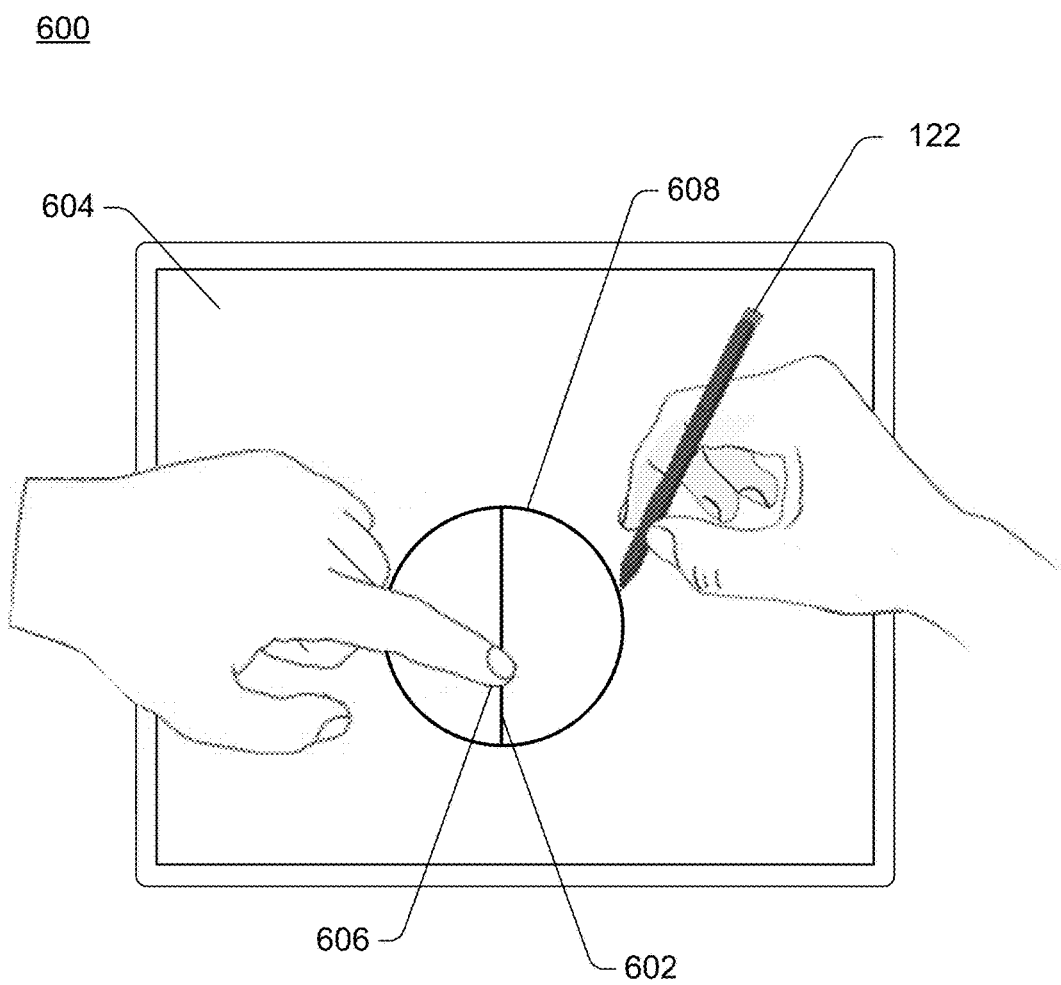

FIG. 6 illustrates an example 600 in which a first input is received from the pen 122, and a second input is received simultaneously with the first input. A line 602 previously drawn on the touchscreen display 604 (e.g., using the pen 122 or otherwise) is shown. The second input is a finger 606 of the user's non-dominant hand touching the line 602 displayed on the touchscreen display 604. In response to the first input and the second input being received simultaneously, a first input behavior of drawing a smooth straight circle having a diameter equal to the length of the line 602 is selected. The pen 122 is used to provide a digital input on the touchscreen display 606 (e.g., in an approximately circular manner), but the input data is modified so that the digital input conforms to a smooth straight circle having a diameter equal to the length of the line 602, providing a digital input that results in display of a smooth straight circle 608 despite any wiggle or wobble that may be present in the pen 122 due to the freehand nature of the first input.

Figure 7:
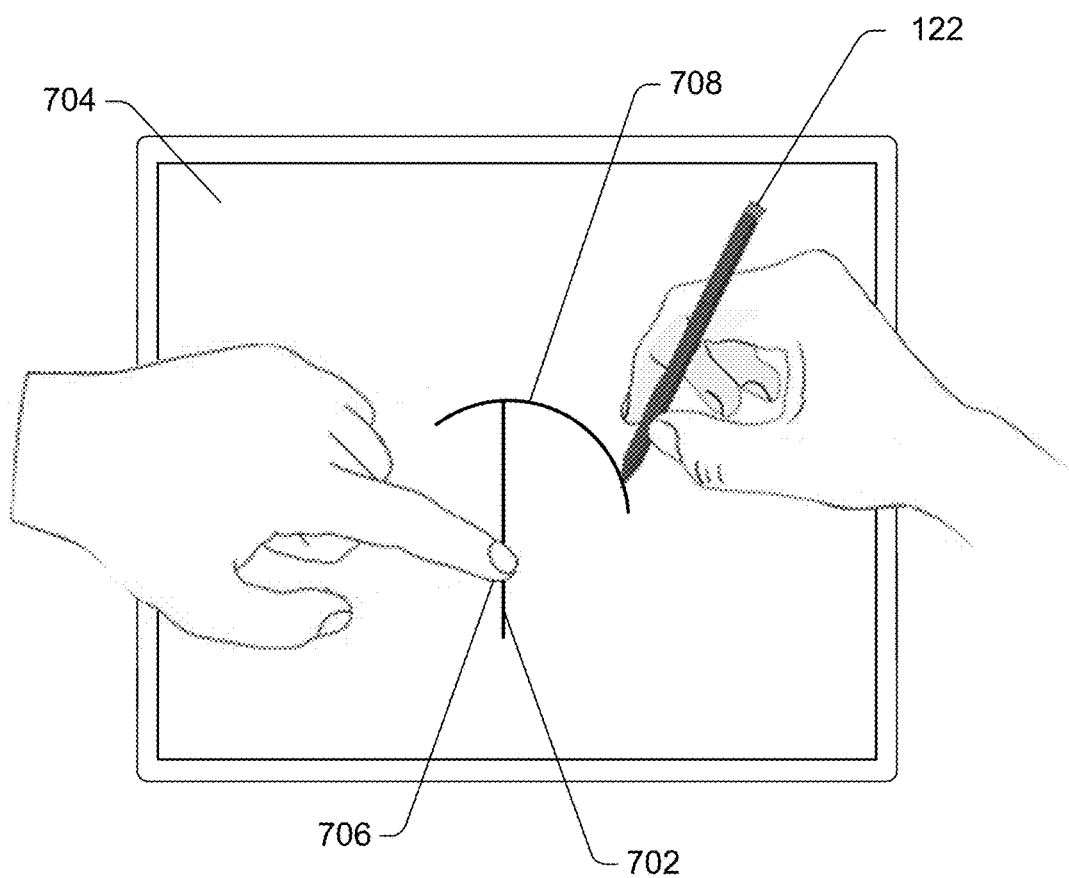

FIG. 7 illustrates an example 700 in which a first input is received from the pen 122, and a second input is received simultaneously with the first input. A line 702 previously drawn on the touchscreen display 704 (e.g., using the pen 122 or otherwise) is shown. The second input is a finger 706 of the user's non-dominant hand touching the line 702 displayed on the touchscreen display 704. In response to the first input and the second input being received simultaneously, a first input behavior of drawing a smooth straight arc having a diameter equal to the length of the line 702 is selected. The pen 122 is used to provide a digital input on the touchscreen display 704 (e.g., in an approximate shape of an arc), but the input data is modified so that the digital input conforms to a smooth straight arc having a radius equal to one-half the length of the line 702 (e.g., a radius as if the arc were part of a circle having diameter equal to the length of the line 702), providing a digital input that results in display of a smooth straight arc 708 despite any wiggle or wobble that may be present in the pen 122 due to the freehand nature of the first input. The length of the arc can be determined in various manners, such as being the length of the digital input provided as the first input. Although illustrated as a smooth straight arc having a radius equal to one-half the length of the line 702, the arc can have a different radius, such as a radius equal to the length of the line 702. Similarly, although illustrated as a smooth straight arc having a center at the middle of the line 702, the center of the arc can be at other locations, such as at the end of the line 702. The location of the center can vary, for example, based on the location of the finger 706 (e.g., if the location of the finger is within a threshold distance of the center of the line 702 then the location of the center of the arc is the middle of the line 702, and if the location of the finger is within a threshold distance of an end of the line 702 then the location of the center of the arc is that end of the line 702).

Figure 8:
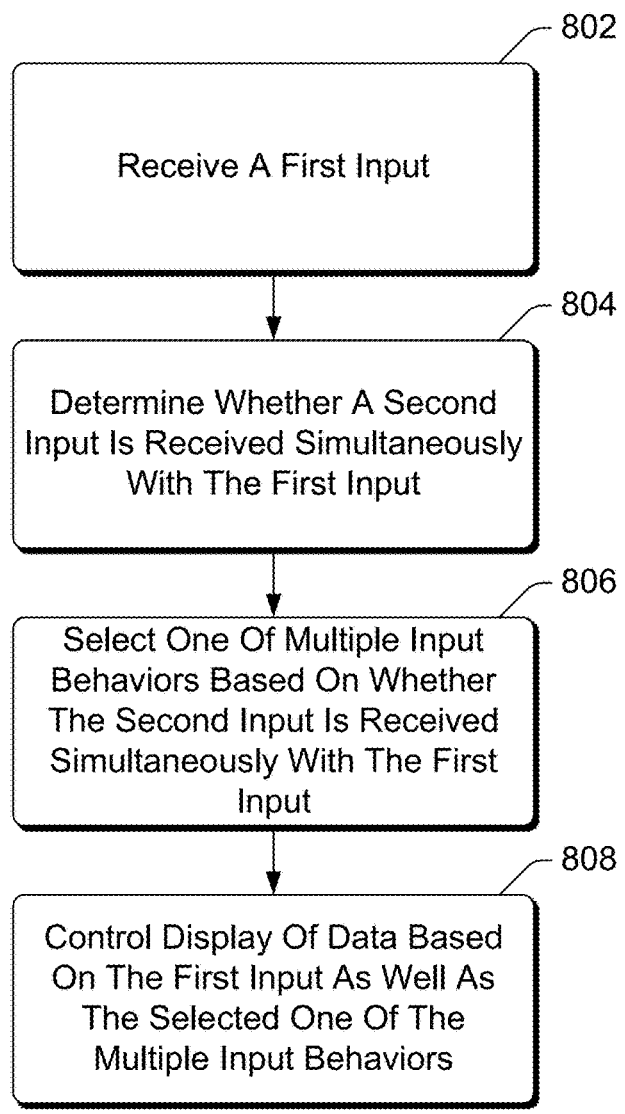
FIG. 8 is a flowchart illustrating an example process for implementing the selecting first digital input behavior based on a second touch input in accordance with one or more embodiments.

FIG. 8 is a flowchart illustrating an example process 800 for implementing the selecting first digital input behavior based on a second input in accordance with one or more embodiments. Process 800 can be implemented in software, firmware, hardware, or combinations thereof. Process 800 is carried out by a digital input system and/or, such as the digital input system 116 of FIG. 1 or FIG. 2, and/or the application 106 of FIG. 1 or FIG. 2. Process 800 is shown as a set of acts and is not limited to the order shown for performing the operations of the various acts. Process 800 is an example process for implementing the selecting first digital input behavior based on a second input; additional discussions of implementing the selecting first digital input behavior based on a second input are included herein with reference to different figures.

In process 800, a first input is received by the digital input system (act 802). The first input is received from an input device or object, such as an active pen, a stylus, a finger, and so forth. The first input is received, for example, from the dominant hand of the user. In one or more embodiments, this first input is freehand input.

A determination is made as to whether a second input is received simultaneously with the first input (act 804). In one or more embodiments, the second input is a touch input. The second input is received, for example, from the non-dominant hand of the user. Particular criteria for the second input (e.g., a particular number of fingers touching a touchscreen or other input device, a location of a touchscreen or other input device that is touched, etc.) may be applied to determine whether the second input is received simultaneously with the first input.

One of multiple input behaviors is selected based on whether the second input is received simultaneously with the first input (act 806). As discussed above, two different input behaviors can be selected from, one being in situations in which the first input is received simultaneously with the second input, and the other of which is selected in situations in which the first input is not received simultaneously with the second input.

The display of data is controlled based on the first input as well as the selected one of the multiple behaviors (act 808). This controlling of the display of data can take various forms, such as displaying modified input data, displaying additional input data, erasing data, setting a destination location or icon, and so forth.

Although selection between two different behaviors is discussed herein, it should be noted that selection of one among three or more different behaviors can analogously be supported by the digital input system. These three or more different behaviors can be supported based on differences in second input criteria. For example, one behavior can be selected if the first input is not received simultaneously with a second input, a different behavior can be selected if the first input is received simultaneously with a second input that is a single finger touching a touchscreen, and yet another behavior can be selected if the first input is received simultaneously with a second input that is three fingers touching the touchscreen.

The techniques discussed herein thus support various usage scenarios. For example, a user can touch the touchscreen or other input device with three fingers of his or her non-dominant hand, and in response the pen used to provide digital input changes from drawing a circle with a wiggly line to drawing a smooth circle. By way of another example, a user can select whether he or she desires to draw a line freeform or along a stencil edge—if the user provides the first input without simultaneously providing the second input then the line is drawn freeform, but if the user provides the first input while simultaneously providing the second input then the line is drawn constrained by a stencil edge (e.g., a ruler or other straight edge). By way of another example, a user can touch the touchscreen or other input device with a single finger of his or her non-dominant hand and draw a line with a pen using his or her dominant hand, and in response the pen draws a smooth straight line. By way of another example, a user can touch an arbitrary ink stroke displayed on a touchscreen with one finger of his or her non-dominant hand and draw a smooth straight (e.g., perfect) circle or arc using the length of the stroke as the diameter.

The user is thus provided with an easy and intuitive user interface for selecting first input behavior. Resources for maintaining and providing additional menu selections to allow for different types of input behavior need not be maintained. Providing the easy and intuitive user interface for selecting first input behavior can also reduce the amount of time taken for a user to provide the digital input he or she desires, thereby conserving resources and energy usage of the computing device.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 9:
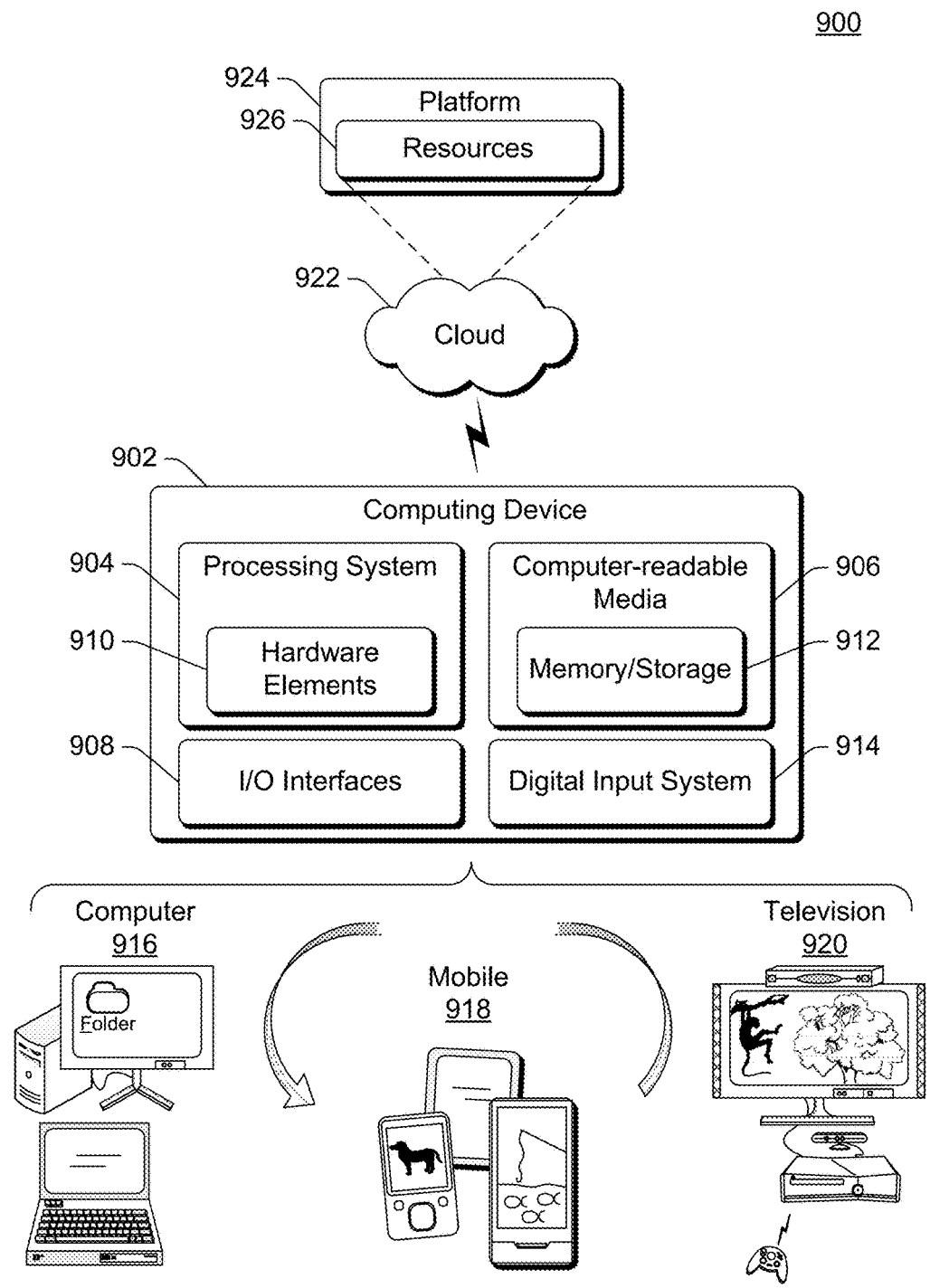
FIG. 9 illustrates an example system that includes an example computing device that is representative of one or more systems and/or devices that may implement the various techniques described herein.

FIG. 9 illustrates an example system generally at 900 that includes an example computing device 902 that is representative of one or more systems and/or devices that may implement the various techniques described herein. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

The one or more input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

The computing device 902 also includes a digital input system 914. The digital input system 914 provides various functionality supporting selecting first digital input behavior based on a second input as discussed above. The digital input system 914 can be, for example, the digital input system 116 of FIG. 1 or FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules as a module that is executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 902 may assume a variety of different configurations, such as for computer 916, mobile 918, and television 920 uses. Each of these configurations includes devices that may have generally different constructs and capabilities, and thus the computing device 902 may be configured according to one or more of the different device classes. For instance, the computing device 902 may be implemented as the computer 916 class of a device that includes a personal computer, desktop computer, a multi-screen computer, laptop computer, netbook, and so on.

The computing device 902 may also be implemented as the mobile 918 class of device that includes mobile devices, such as a mobile phone, portable music player, portable gaming device, a tablet computer, a multi-screen computer, and so on. The computing device 902 may also be implemented as the television 920 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This functionality may also be implemented all or in part through use of a distributed system, such as over a "cloud" 922 via a platform 924 as described below.

The cloud 922 includes and/or is representative of a platform 924 for resources 926. The platform 924 abstracts underlying functionality of hardware (e.g., servers) and software resources of the cloud 922. The resources 926 may include applications and/or data that can be utilized while computer processing is executed on servers that are remote from the computing device 902. Resources 926 can also include services provided over the Internet and/or through a subscriber network, such as a cellular or Wi-Fi network.

The platform 924 may abstract resources and functions to connect the computing device 902 with other computing devices. The platform 924 may also serve to abstract scaling of resources to provide a corresponding level of scale to encountered demand for the resources 926 that are implemented via the platform 924. Accordingly, in an interconnected device embodiment, implementation of functionality described herein may be distributed throughout the system 900. For example, the functionality may be implemented in part on the computing device 902 as well as via the platform 924 that abstracts the functionality of the cloud 922.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device, the method comprising: receiving a first input from an input device or object, the first input comprising a freehand input; determining whether a second input to the computing device is received simultaneously with receipt of the first input; selecting one of multiple input behaviors for the first input, the selecting including selecting a first behavior for the first input in response to determining that the second input to the computing device is received simultaneously with receipt of the first input, and selecting a second behavior for the first input in response to determining that the second input to the computing device is received at a different time than the first input; and controlling a display of data by the computing device based at least on both the first input and the selected one of the multiple input behaviors.

Alternatively or in addition to any of the above described methods, any one or combination of: the first input comprising a touch input to the computing device and the second input comprising a touch input to the computing device; the first input comprising a touch input to a touchscreen input device; the input device comprising an active pen; the receiving the first input comprising receiving the first input from a dominant user hand, and the method further comprising receiving the second input from a non-dominant user hand; the first behavior comprising constraining a digital input corresponding to the first input to being a digital input along an edge of a stencil, the second behavior comprising allowing the digital input corresponding to the first input to be a freeform input; the second input comprising a single-finger touch input, and the first behavior comprising constraining a digital input corresponding to the first input to a smooth straight line; the second input comprising a single-finger touch input on a displayed ink stroke, and the first behavior comprising constraining a digital input corresponding to the first input to a smooth straight circle or arc having a diameter or radius equal to the length of the displayed ink stroke; the controlling the display of data comprising displaying digital ink using the selected one of the multiple input behaviors; the selecting further comprising selecting, based on which of one or more criteria corresponding to the second input are satisfied, the second behavior for the first input or a third of the multiple input behaviors for the first input.

A computing device comprising: an input data collection module comprising instructions configured to receive a first input and a second input, the first input comprising a freehand input; an input behavior determination module comprising instructions configured to determine whether the second input is received simultaneously with the first input, and further configured to select a first of multiple behaviors for the first input in response to the second input being received simultaneously with the first input, and to select a second of the multiple behaviors for the first input in response to the second input being received at a different time than the first input; and a data display module comprising instructions configured to control a display of data based at least on both the first input and the selected behavior for the first input.

Alternatively or in addition to any of the above described computing devices, any one or combination of: the first input comprising a touch input to a touchscreen of the computing device; the first input comprising input received via an active pen; the first input being received from a dominant user hand, and the second input being received from a non-dominant user hand; the first behavior comprising constraining a digital input corresponding to the first input to being a digital input along an edge of a stencil, the second behavior comprising allowing the digital input corresponding to the first input to be a freeform input; the data display module being further configured to display digital ink using the selected behavior; the input behavior determination module being further configured to select, based on which of one or more criteria corresponding to the second input are satisfied, the second behavior for the first input or a third of the multiple behaviors for the first input.

A computing device comprising: one or more processors; and a computer-readable storage medium having stored thereon multiple instructions that, responsive to execution by the one or more processors, cause the one or more processors to: receive a first input including movement of an input device or object; determine whether a second input is received by the computing device simultaneously with receipt of the first input; select one of multiple input behaviors for the first input, the selecting including selecting a first behavior for the first input in response to determining that the second input to the computing device is received simultaneously with receipt of the first input, and selecting a second behavior for the first input in response to determining that the second input to the computing device is received at a different time than the first input; and control a display of data by the computing device based at least on both the first input and the selected one of the multiple input behaviors.

Alternatively or in addition to any of the above described computing devices, any one or combination of: the computing device further comprising a touchscreen, and the first input comprising a touch input to the touchscreen; the receiving comprising receiving the first input from an active pen.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
    receiving a first input from an input device or object, the first input comprising a freehand input;
    determining whether a second input to the computing device is received simultaneously with receipt of the first input based on applying a set of criteria including:
        continuing to receive the first input; and
        concurrently receiving the second input for at least a threshold amount of time;
    selecting one of multiple input behaviors for the first input, the selecting including selecting a first behavior for the first input in response to determining that the second input to the computing device is received simultaneously with receipt of the first input based on satisfying the set of criteria, and selecting a second behavior for the first input in response to determining that the second input to the computing device is received at a different time than the first input based on not satisfying the criteria; and
    controlling a display of data by the computing device based at least on both the first input and the selected one of the multiple input behaviors.

2. The method as recited in claim 1, the first input comprising a touch input to the computing device and the second input comprising a touch input to the computing device.

3. The method as recited in claim 1, the first input comprising a touch input to a touchscreen input device.

4. The method as recited in claim 1, the input device comprising an active pen.

5. The method as recited in claim 1, the receiving the first input comprising receiving the first input from a dominant user hand, and the method further comprising receiving the second input from a non-dominant user hand.

6. The method as recited in claim 1, the first behavior comprising constraining a digital input corresponding to the first input to being a digital input along an edge of a stencil, the second behavior comprising allowing the digital input corresponding to the first input to be a freeform input.

7. The method as recited in claim 1, the second input comprising a single-finger touch input, and the first behavior comprising constraining a digital input corresponding to the first input to a smooth straight line.

8. The method as recited in claim 1, the second input comprising a single-finger touch input on a displayed ink stroke, and the first behavior comprising constraining a digital input corresponding to the first input to a smooth straight circle or arc having a diameter or radius equal to the length of the displayed ink stroke.

9. The method as recited in claim 1, the controlling the display of data comprising displaying digital ink using the selected one of the multiple input behaviors.

10. The method as recited in claim 1, the first behavior including causing display of a stencil such that a location at which the first input is received is adjacent to an edge of the stencil.

11. A computing device comprising:
    an input data collection module comprising instructions configured to receive a first input and a second input, the first input comprising a freehand input;
    an input behavior determination module comprising instructions configured to:
        determine whether the second input is received simultaneously with the first input based on applying a set of criteria including:
            continuing to receive the first input; and
            concurrently receiving the second input for at least a threshold amount of time; and
        select a first of multiple behaviors for the first input in response to the second input being received simultaneously with the first input based on satisfying the set of criteria, and to select a second of the multiple behaviors for the first input in response to the second input being received at a different time than the first input based on not satisfying the set of criteria; and
    a data display module comprising instructions configured to control a display of data based at least on both the first input and the selected behavior for the first input.

12. The computing device as recited in claim 11, the first input comprising a touch input to a touchscreen of the computing device.

13. The computing device as recited in claim 11, the first input comprising input received via an active pen.

14. The computing device as recited in claim 11, the first input being received from a dominant user hand, and the second input being received from a non-dominant user hand.

15. The computing device as recited in claim 11, the first behavior comprising constraining a digital input corresponding to the first input to being a digital input along an edge of a stencil, the second behavior comprising allowing the digital input corresponding to the first input to be a freeform input.

16. The computing device as recited in claim 11, the data display module being further configured to display digital ink using the selected behavior.

17. The computing device as recited in claim 11, the first behavior including causing display of a stencil such that a location at which the first input is received is adjacent to an edge of the stencil.

18. A computing device comprising:
    one or more processors; and a computer-readable storage medium having stored thereon multiple instructions that, responsive to execution by the one or more processors, cause the one or more processors to:
receive a first input including movement of an input device or object;
determine whether a second input is received by the computing device simultaneously with receipt of the first input based on applying a set of criteria including:
continuing to receive the first input; and
concurrently receiving the second input for at least a threshold amount of time;
select one of multiple input behaviors for the first input, the selecting including selecting a first behavior for the first input in response to determining that the second input to the computing device is received simultaneously with receipt of the first input based on satisfying the set of criteria, and selecting a second behavior for the first input in response to determining that the second input to the computing device is received at a different time than the first input based on not satisfying the set of criteria; and
control a display of data by the computing device based at least on both the first input and the selected one of the multiple input behaviors.

19. The computing device as recited in claim 18, the computing device further comprising a touchscreen, and the first input comprising a touch input to the touchscreen.

20. The computing device as recited in claim 18, the receiving comprising receiving the first input from an active pen.

\* \* \* \* \*